United States Patent
Boyer

[11] 3,994,208
[45] Nov. 30, 1976

[54] PISTON FOR HIGH-PRESSURE HYDRAULIC MACHINE

[75] Inventor: Jean-Jacques Boyer, Montchauvet, France

[73] Assignee: Societe Anonyme Secmafer, Buchelay-Mantes, France

[22] Filed: Sept. 16, 1974

[21] Appl. No.: 505,960

[30] Foreign Application Priority Data
Sept. 28, 1973 France .............................. 73.34850

[52] U.S. Cl. .................................... 92/246; 92/240
[51] Int. Cl.² .......................... F16J 1/04; F16J 9/08
[58] Field of Search ...................... 92/246, 240, 245

[56] References Cited
UNITED STATES PATENTS

| ,020,836 | 3/1912 | Moore | 92/246 X |
| ,224,999 | 5/1917 | Barthel | 92/246 X |
| 1,616,310 | 2/1927 | Esnault-Pelterie | 92/246 |
| 2,932,865 | 4/1960 | Bauer | 92/246 X |
| 2,992,052 | 7/1961 | De John | 92/246 |
| 3,272,079 | 9/1966 | Bent | 92/240 X |

FOREIGN PATENTS OR APPLICATIONS

| 849,108 | 11/1939 | France | 92/240 |
| 569,912 | 11/1957 | Italy | |

Primary Examiner—Irwin C. Cohen
Attorney, Agent, or Firm—Young & Thompson

[57] ABSTRACT

The present invention concerns a piston for high pressure hydraulic machines. Said piston comprises a cylindrical body having at the periphery thereof a resiliently deformable cylindrical flange which, in use, forms a tight seal with the cylinder, the flange being integral with the piston body and forming, by means of its inner surface, a recess in the end face of the piston which is subjected to high pressure.

1 Claim, 1 Drawing Figure

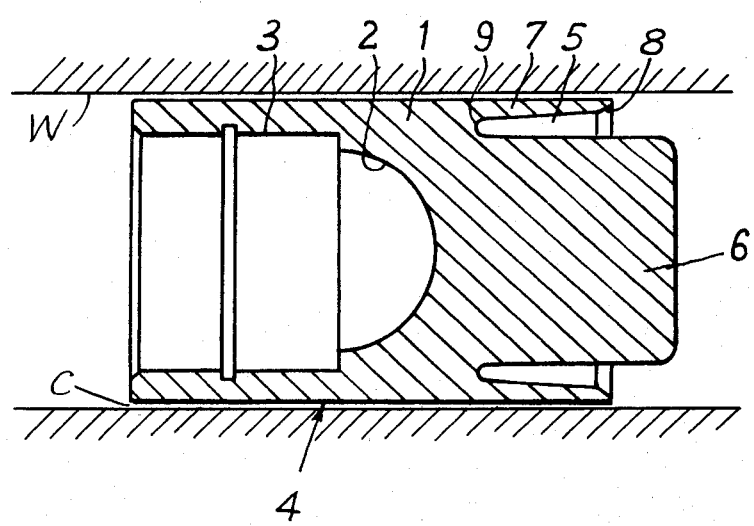

PISTON FOR HIGH-PRESSURE HYDRAULIC MACHINE

The present invention relates to pistons for high-pressure hydraulic machines, particularly hydraulic motors and pumps of the barrel type. As known, the efficiency of these machines depends to a great extent on the tightness of the pistons in their respective cylinders. However, the seals of the pistons must have a certain amount of clearance to avoid seizure, particularly at low operational pressures, at which pressures the lubrication through the power transmission oil is at a minimum and is therefore insufficient. This clearance is also important as far as leakages are concerned, the leakages increasing with the temperature and the pressure of the oil and causing the oil to undergo a lamination process with consequent degradation, overheating and power loss.

In view of solving this problem, a tight seal has been suggested which allows a relatively large clearance to occur for slight pressure differentials such as those produced during the inlet strokes of hydraulic pumps and outlet strokes of hydraulic motors and practically no clearance during the high pressure strokes. To this end, French Pat. No. 72.11906 and its Patent of Addition No. 72.17091 disclose seals comprising a cylindrical resilient jacket which, together with the member on which it is mounted, forms an annular space having means for creating in this annular space a pressure which is dependent on the pressure to which the seal is subjected. Good results have been attained with these seals. However, technical problems have been encountered where the operation pressures exceeded 500 bars. In particular, it was found to be particularly difficult to ensure tightness between the cylindrical resilient jacket undergoing an extremely rapid alternating expansion-and-contraction cycle and the piston body, because all conventional sealing materials have the tendency of running off. All this has resulted in a complex construction as disclosed in the Patent of Addition No. 72.17091 without achieving the desired result.

An object of the present invention is to eliminate the disadvantages referred to above.

The present invention consists in a piston for high-pressure hydraulic machines, comprising a cylindrical body having at the periphery thereof a resiliently deformable cylindrical flange which, in use, forms a tight seal with the cylinder, the flange being integral with the piston body and forming, by means of its inner surface, a recess in the end face of the piston which is subjected to high pressure.

The cylindrical flange is preferably formed by an annular groove machined in the body of the piston from the end face thereof.

According to another feature, the thickness of the cylindrical flange increases from the outer extremity thereof to the bottom of the groove with an angle not exceeding 6°, the bottom of the groove being radiused and polished.

One embodiment of the piston according to the invention will now be described below with reference to the accompanying drawing which shows a piston in longitudinal cross-section.

A piston 1 is formed of bronze or similar metal and its body is formed in a known manner with a hemispherical recess 2 which accomodates the head of a connecting rod (not shown), the recess 2 opening into a bore 3 provided with a groove for a ring which holds the head of the connecting rod.

The outer surface 4 of the piston is machined to the nominal diameter with a clearance C of about 1/100 mm. with the surrounding cylindrical wall W of the piston. An annular, axially extending groove 5 is formed in the end portion or head of the piston body which faces the compression chamber. The groove 5 forms a cylindrical end portion 6 and an encircling flange 7, the inner surface of which faces the cylindrical end portion 6 and defines an angle of 4° with the outer surface 4. The outer extremity 8 of the flange 7 is chamfered and the bottom 9 of the groove 5 is radiused and polished to prevent cracking.

By way of numerical example, for a bronze piston with a diameter of 25 mm and a length of 46 mm, the cylindrical end portion 6 has a diameter of 17 mm and the bottom 9 of the groove is 17 mm from the end surface of the cylindrical portion 6. The outer extremity 8 of the flange 7 is 5.5 mm back with respect to the end face of the portion 6. The minimum thickness of the flange 7 is of 0.75 mm at its outer extremity and the angle of the frusto conical surface forming the inner surface of the flange is 4°.

The high pressure exerted against the inner surface of the cylindrical flange 7 tends to expand the latter due to elongation of the metal and thus eliminates the machining clearance which allows a practically uniform leakage to be obtained independently of the operational pressure, which leakage has to be limited to that necessary for lubrication to take place.

What we claim is:

1. In a hydraulic machine comprising in combination a cylinder and a piston in said cylinder, said piston comprising a body of bronze having a cylindrical outer surface and having at the periphery thereof an annular groove opening in the end face thereof which is subjected to high pressure, said groove being defined between a cylindrical inner surface and a truncated conical outer surface joined at the bottom by an annular surface which is semi-circular in cross section, said conical outer surface forming an angle not exceeding 6° with the cylindrical outer surface of the piston, the piston between said cylindrical outer surface and said conical surface comprising a peripheral thin resiliently deformable flange having clearance with the cylinder of 1/100 mm. when undeformed but slidably engaging the cylinder when deformed outwardly by high pressure.

* * * * *